(12) United States Patent
Li

(10) Patent No.: US 9,184,884 B2
(45) Date of Patent: Nov. 10, 2015

(54) SYSTEM AND METHOD FOR CLOUD-BASED LIVE MEDIA INGESTION AND TRANSCODING

(71) Applicant: FutureWei Technologies, Inc., Plano, TX (US)

(72) Inventor: Hongbing Li, Skillman, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 102 days.

(21) Appl. No.: 13/896,858

(22) Filed: May 17, 2013

(65) Prior Publication Data

US 2013/0308436 A1 Nov. 21, 2013

Related U.S. Application Data

(60) Provisional application No. 61/648,906, filed on May 18, 2012.

(51) Int. Cl.
| | |
|---|---|
| *G01R 31/08* | (2006.01) |
| *H04L 1/22* | (2006.01) |
| *H04N 21/231* | (2011.01) |
| *H04N 21/2343* | (2011.01) |
| *H04N 21/24* | (2011.01) |
| *H04N 21/6405* | (2011.01) |

(52) U.S. Cl.
CPC ............ *H04L 1/22* (2013.01); *H04N 21/23106* (2013.01); *H04N 21/234309* (2013.01); *H04N 21/2404* (2013.01); *H04N 21/6405* (2013.01)

(58) Field of Classification Search
CPC ........................................................ H04L 1/22
USPC .................................. 370/216–229, 400–484
See application file for complete search history.

(56) References Cited

U.S. PATENT DOCUMENTS

2008/0195664 A1* 8/2008 Maharajh et al. .......... 707/104.1
2013/0276048 A1* 10/2013 Krasic et al. .................. 725/116

* cited by examiner

*Primary Examiner* — Iqbal Zaidi
(74) *Attorney, Agent, or Firm* — Slater & Matsil, L.L.P.

(57) ABSTRACT

Embodiments are provided for a cloud-based reliable media ingestion and transcoding. The embodiments comprise an improved backup mechanism where each worker node, such as a virtual machine, physical machine, workstation, or server, in a cloud or Internet environment handles one streamed media/video channel transcoding and another streamed media/video channel ingestion backup. To reduce ingestion storage demands, the ingestion backup storage is based on a pre-determined relatively short-term sliding window. When an ingestion and transcoding worker node fails, a new worker node is brought up to take over from the failed worker node the live transcoding task of a first channel and the ingestion backup task of a second channel. Additionally, the new worker node retrieves backup data for the first channel from a third worker node and a central media storage to ensure seamlessly uninterrupted live ingestion and transcoding of the first channel, and continues the ingestion backup task of the second channel.

16 Claims, 3 Drawing Sheets

SYSTEM AND METHOD FOR CLOUD-BASED LIVE MEDIA INGESTION AND TRANSCODING

This application claims the benefit of U.S. Provisional Application No. 61/648,906 filed on May 18, 2012 by Hongbing Li and entitled "System and Method for Cloud-Based Live Media Ingestion and Transcoding," which is hereby incorporated herein by reference as if reproduced in its entirety.

TECHNICAL FIELD

The present invention relates to the field of media processing, and, in particular embodiments, to a system and method for cloud-based reliable live media ingestion and transcoding.

BACKGROUND

In a large media service head-end or large satellite TV monitoring center, there can be tens, hundreds or even thousands of live video feeds to be monitored and processed. Video ingestion and transcoding are two common processes that are implemented, where reliability is normally an important concern. Video ingestion involves the process of transferring content to a digital editing or storage system. The process includes digitizing the signal, compressing the digital data stream to reduce the amount of data stored and, storing the data as a file on a hard disk. Often, additional data is added to the file, such as program identifiers and time stamps. Transcoding is the direct digital-to-digital data conversion of one encoding to another, such as for movie data files or audio files. This is usually done in cases where a target device (or workflow) does not support the format or has limited storage capacity that mandates a reduced file size, or to convert incompatible or obsolete data to a better-supported or modern format.

Considering the high storage requirements and input/output (I/O) demands for high definition (HD) video ingestion, and the high computation demand on transcoding, 1 plus 1 (1+1) backup mechanisms for each live channel is used to ensure reliability. For example, a 1+1 backup mechanism for both live ingestion and transcoding can be used. Alternatively, a 1+1 backup mechanism for ingestion with central storage based transcoding can be used. Such mechanisms carry a substantially high cost, e.g., for large centers. There is a need for an improved and reliable backup mechanism for media or video ingestion and transcoding.

SUMMARY OF THE INVENTION

In accordance with an embodiment, a method for media ingestion and transcoding includes receiving, at an error recovery worker node, instruction to take over live ingestion and transcoding of a streamed channel corresponding to a failed ingestion and transcoding worker node. The error recovery worker node then retrieves stored data of the streamed channel and transcodes the retrieved data until the transcoded data catches up to a live data point received at the error recovery worker node. Upon catching up to the live data point, the error recovery worker node resumes live transcoding of data for the channel from the live data point.

In accordance with another embodiment, a method implemented by a worker node for media ingestion and transcoding includes performing live ingestion of data for a first media channel assigned to the worker node, live transcoding the live ingested data, and forwarding the live transcoded data to a central media storage for a plurality of ingestion and transcoding worker nodes. The method also includes performing, at the worker node, live ingestion of data for a second media channel assigned to a second ingestion and transcoding worker node and temporary storing the live ingested data within a short-term sliding window for the second media channel. The short-term sliding window is predetermined relative to content of the second media channel.

In accordance with another embodiment, a network component for media ingestion and transcoding comprises at least one processor and a computer readable storage medium storing programming for execution by the at least one processor. The programming includes instructions to perform ingestion of real-time data for a first media channel assigned to the network component, transcode the ingested real-time data, and forward the transcoded real-time data to a central media storage for a plurality of ingestion and transcoding worker nodes. The programming includes further instructions to perform ingestion of real-time data for a second media channel assigned to a second network component for ingestion and transcoding and temporary store, for a predetermined time window length, the ingested data for the second media channel.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
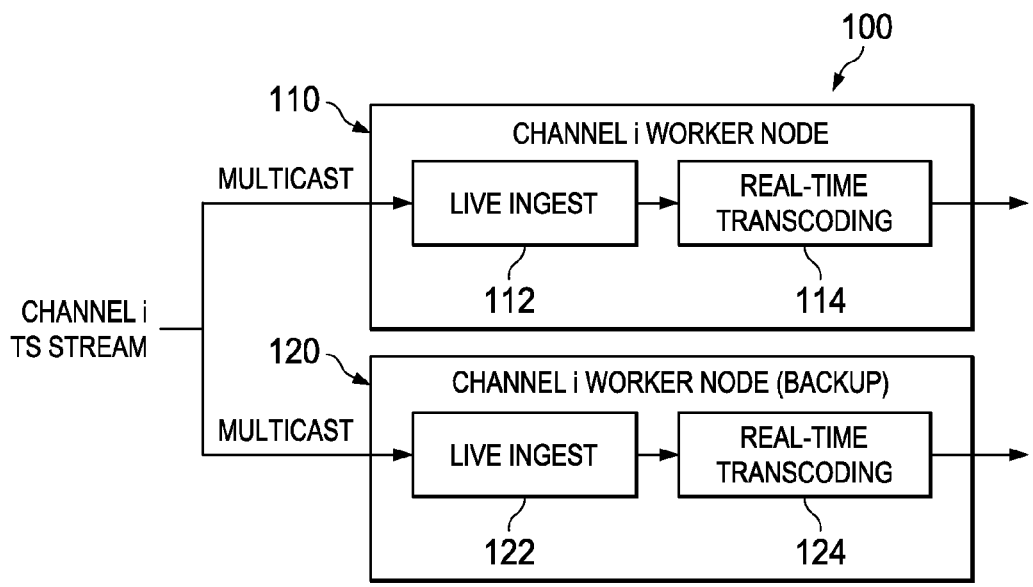
FIG. 1 is a diagram that illustrates a 1+1 backup system for live ingestion and transcoding.

FIG. 1 shows a traditional 1+1 backup system 100 for live ingestion and transcoding. For example, the system 100 can be used in a relatively large media service head-end or a relatively large satellite TV monitoring center, where there may be tens, hundreds or even thousands of live video feeds to be monitored and processed. For each live or streaming channel i (i is an index), both a primary or default worker node 110 and a backup worker node 120 are assigned to ensure reliability, bringing high cost for large center. A live ingestion module 112 and a subsequent real-time transcoding module 114 are used in the primary or default worker node 110 to implement live ingestion and transcoding on the channel i (e.g., a transport stream), before sending the channel content to storage (not shown). Similarly, another live ingestion module 122 and a subsequent real-time transcoding module 124 are used in the backup worker node 120 to implement similar live ingestion and transcoding operations on the channel i. The modules can be implemented via software, hardware, or both. The resulting backup content can also be sent to storage, for example when the primary worker node 110 fails. Since this 1+1 system 100 used redundancy in all or most components, the resulting operation, utility, and perhaps storage cost may be doubled.

Figure 2:
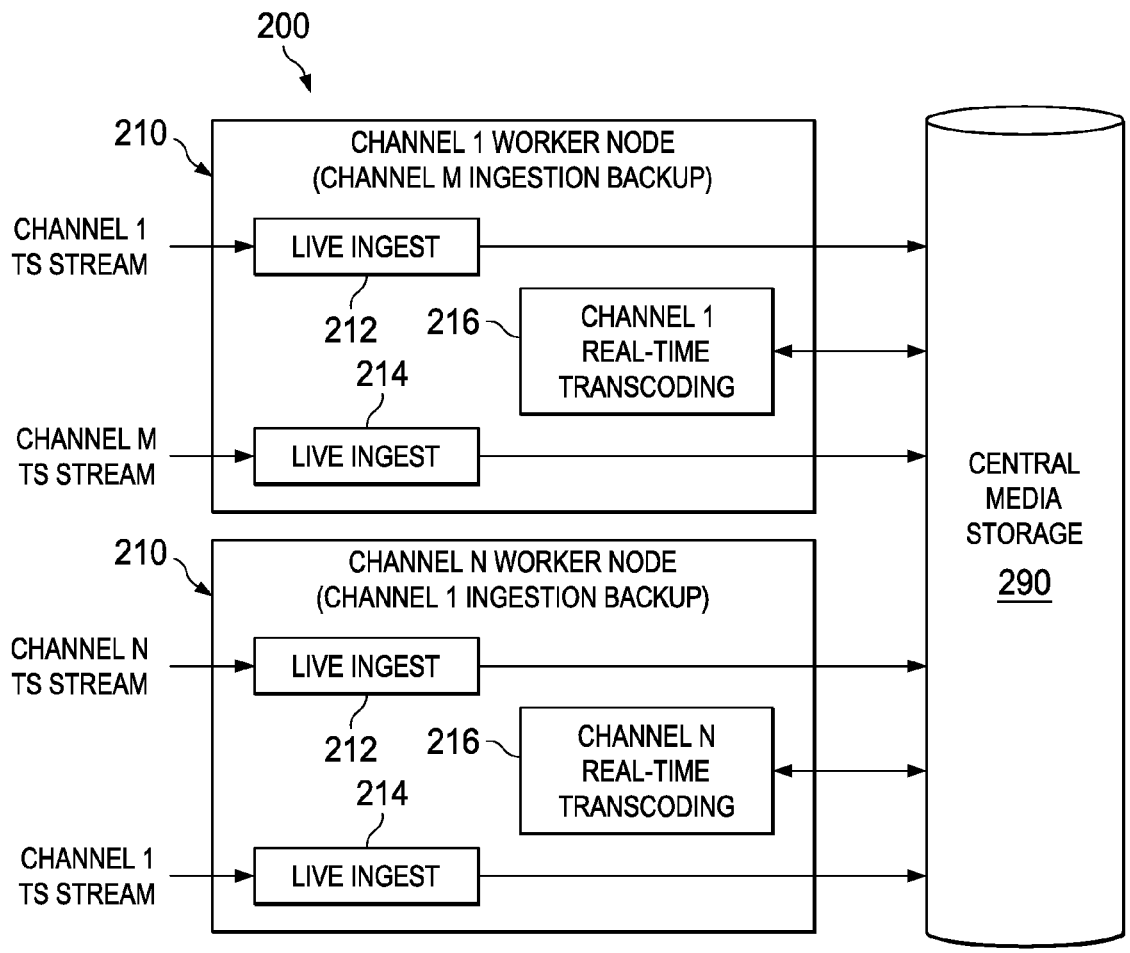
FIG. 2 is a diagram that illustrates a 1+1 backup system for ingestion with central storage based transcoding.

To avoid one extra transcoding worker node on one live channel, one alternative mechanism is to implement backup on the ingestion process only. The transcoding process is then performed on the stored content, e.g., from a central storage. FIG. 2 shows an alternative 1+1 backup system 200 proposed for ingestion with central storage based transcoding. The system 200 comprises a worker node 210 for each channel i. For example, there are N worker nodes 210 corresponding to N channels (N is an integer). The worker nodes 210 are coupled to a central media storage 290. For a channel i, each worker node comprises a live ingestion module 212 for that channel, a real-time transcoding module 216 for that channel, a second live ingestion module 214 for another channel (channel M) from the N channels. The modules 212 and 214 send the processed streams for (channel i and M) to the central media storage 290. The real-time transcoding module 216 receives from the central media storage 290 the previously processed streams or contented of the live ingestion module 212 (for channel i) and implements transcoding operation on the data before sending back the data to the central media storage 290. The stored data of the other channel (channel M) is handled similarly for transcoding at another worker node 210 designated for that channel.

One constraint of the system 200 is the high I/O requirements on the central media storage 290. In comparison to the system 100, the I/O bandwidth consumption on the central media storage 290 may be tripled for the same total of original incoming video bit rates. Considering one typical case as an example, there may be 400 live channels, where each channel corresponds to 20 Mbps HD (High Definition) live streams. The I/O bandwidth requirement on this solution is 400×20× 3=24,000 Mbps. In order to reach this high I/O bandwidth, the storage cost is substantially high with the current distributed file system technologies or cloud storage solutions.

System, method, and apparatus embodiments are provided herein for a cloud-based reliable media (e.g., live video) ingestion and transcoding. The embodiments comprise an improved 1+1 backup mechanism, where each worker node (e.g., a virtual machine (VM), physical machine, workstation, or server) in the cloud handles one streamed media/video channel transcoding and another streamed media/video channel ingestion backup. The cloud typically refers to the Internet, but the embodiments herein can also be implemented in any suitable network or group of networks infrastructure used for streaming or transferring media content, such as video on demand, live video/TV, video/voice calling, or other streamed data. To avoid oversized ingestion storage demands, the ingestion backup can be a short term backup based on a configurable moving time window. For example, streamed data within only a last predetermined period of time is backed up. Once a worker node fails working properly (e.g., due to hardware/software fault in the VM, server, or associated link), a new worker node is brought up to take over the one channel live transcoding task and another channel ingestion backup task. Additionally, the new worker node takes backup data from a third worker node to ensure seamlessly uninterrupted live experience. Compared with other 1+1 backup mechanisms, such as in the systems 100 and 200, this improved 1+1 backup mechanism can save about half of the hardware equipment cost, half of the utility cost, and/or half of the space occupation cost.

Figure 3:
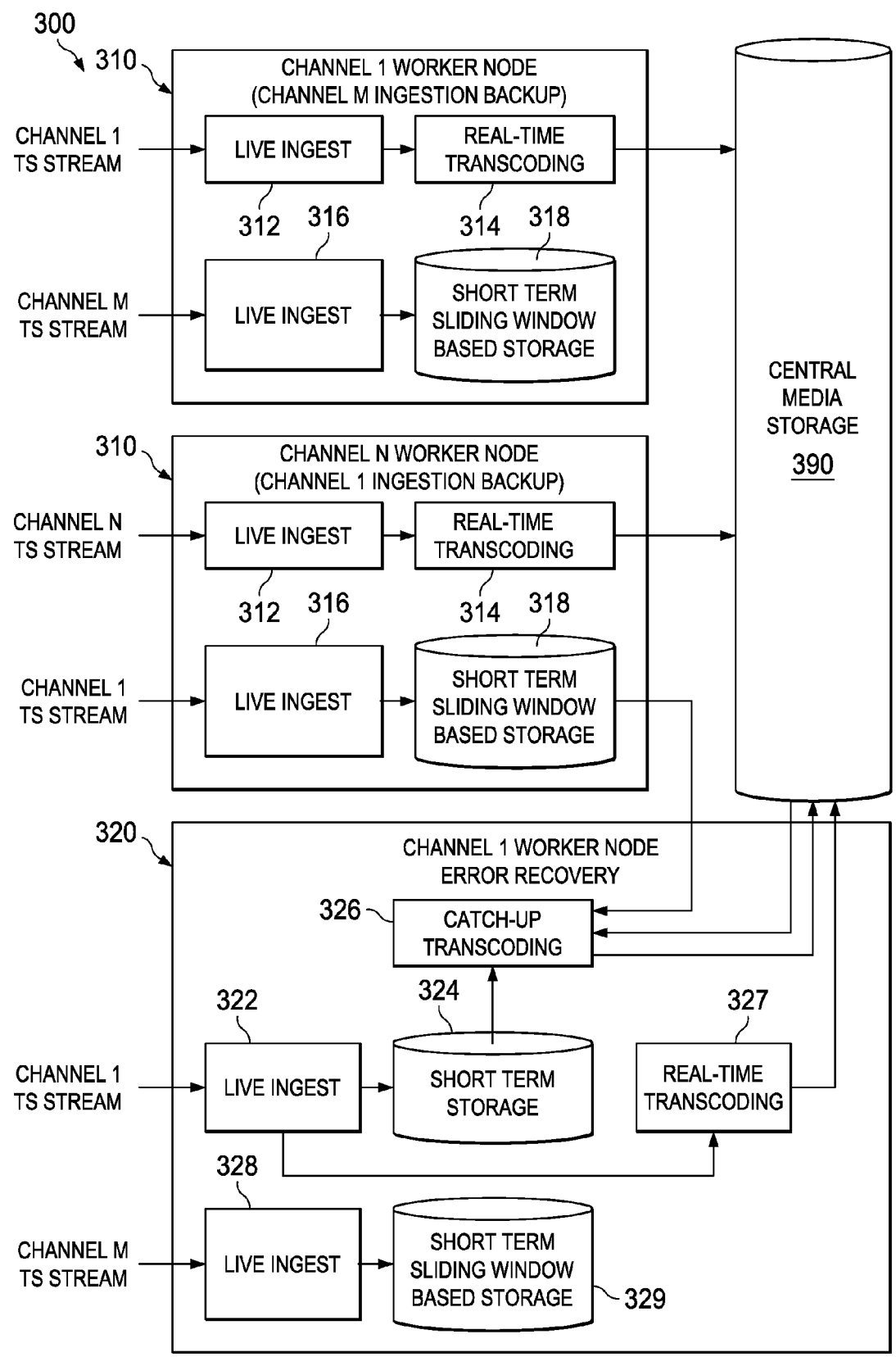
FIG. 3 is a diagram that illustrates a system for improved and reliable backup mechanism for media or video ingestion and transcoding according to an embodiment of the disclosure.

FIG. 3 shows a system 300 for improved and reliable backup mechanism for media or video ingestion and transcoding according to an embodiment of the disclosure. For each channel i, the system 300 comprises a worker node 310 for each channel i. For example, there are N worker nodes 310 corresponding to N channels (N is an integer). The worker nodes 310 are coupled to a central media storage 390. For a channel i, each worker node comprises a live ingestion module 312 for that channel, a real-time transcoding module 314 for that channel, a second live ingestion module 316 for another channel (e.g., for channel M at channel 1 worker node, or channel 1 at channel N worker node) from the N channels, and a short term storage 318 local at the worker node 310 for output of the second live ingestion module 316 for the other channel. For each channel i, the real-time transcoding module 314 sends the processed streams to the central media storage 390. The short term storage 318 is a short-term sliding window based storage for backing up the other channel data after ingestion. The short term storage 318 stores the output of the second ingestion module 316 for a pre-determined time window or period. The short-term sliding window can be predetermined relative to content of the other channel data, for example to store 3 minutes of video, few video segments, or any other determined short-period of streamed data. When the time window expires, the stored data is replaced with subsequent output of the second ingestion module 316 corresponding to the next time window of same duration. The short term storage 318 may be a Read Only Memory (RAM) device, a physical hard disk, or any other suitable storage medium. In the system 200, there are two different worker nodes 310 that receive each of the channels. For example, FIG. 1 shows two different worker nodes 310 that receive the channel 1 at corresponding live ingestion module 312 and second live ingestion module 316.

Further, when a worker node 310 for a channel i fails (for example for channel 1), an error recovery worker node 320 is brought up (triggered or initiated) in the cloud. The error recovery worker node 320 comprises a live ingestion module 322 configured similar to the live ingestion module 310), a real-time transcoding module 327 configured similar to the real-time transcoding module 314, a second live ingestion module 328 configured similar to the second live ingestion module 316), and a short term storage 329 configured similar to the a short term storage 318. Additionally, the error recovery worker node 320 comprises a second short term storage 324 and a catch-up transcoding module 326 for handling transcoding of short term missed channel i data due to the failure of the corresponding channel i worker node 310. When the error recovery worker node 320 is started to take over for channel i worker node 310, the live ingestion module 322 processes the incoming transport stream for channel i and send it to the second short term storage 324, which may have a predetermined storage size. The second short term storage 324 may also be a short-term sliding window based temporary storage. The second short term storage 324 buffers the received data from the live ingestion module 322. The catch-up transcoding module 326 collects any needed amount of stored data for channel i from the central media storage 390, the short term storage 318 at a corresponding (and operational) worker node 310, and/or the second short term storage 324, and performs transcoding on that data. The catch-up transcoding module 326 then sends the output to the central media storage 390. Once the transcoding at the catch-up transcoding module 326 has caught up to the live point at the live ingestion module 322, the live ingestion module 322 can begin forwarding its output to the real-time transcoding module 327 to resume normal live transcoding operation. In another embodiment, the error recovery worker node 320 comprises a single transcoding module that performs first catch-up transcoding on the collected stored data (as described above) and then resumes live transcoding on live data from the live ingestion module 322.

The size of the second short term storage 324 can be predetermined based on the processing speed/capability of the catch-up transcoding module 326 versus the real-time transcoding module 327. For example the catch-up transcoding module 326 may handle 60 frames/second (or more) while the real-time transcoding module 327 handles may only handle 30 frames/second. Since the error recovery worker node 320 runs two transcoding modules (326 and 327), the error recovery worker node 320 (e.g., a VM or workstation) may have more processing power and resources (e.g., CPUs, memory, processing speed) than the worker nodes 310. A predetermined number or percentage (e.g., 10%) VMs or workstations can serve as error recovery worker nodes 320 in the cloud to handle failures of worker nodes 310. Although FIG. 1 shows a channel 1 error recovery worker node 320 for handling channel 1 and channel M ingestion/transcoding, the error recovery worker node 320 can handle any channels corresponding to the failed worker node 310. Further, multiple error recovery channels can operate at the same time to handle error recovery of multiple worker nodes 310 for different channels.

Figure 4:
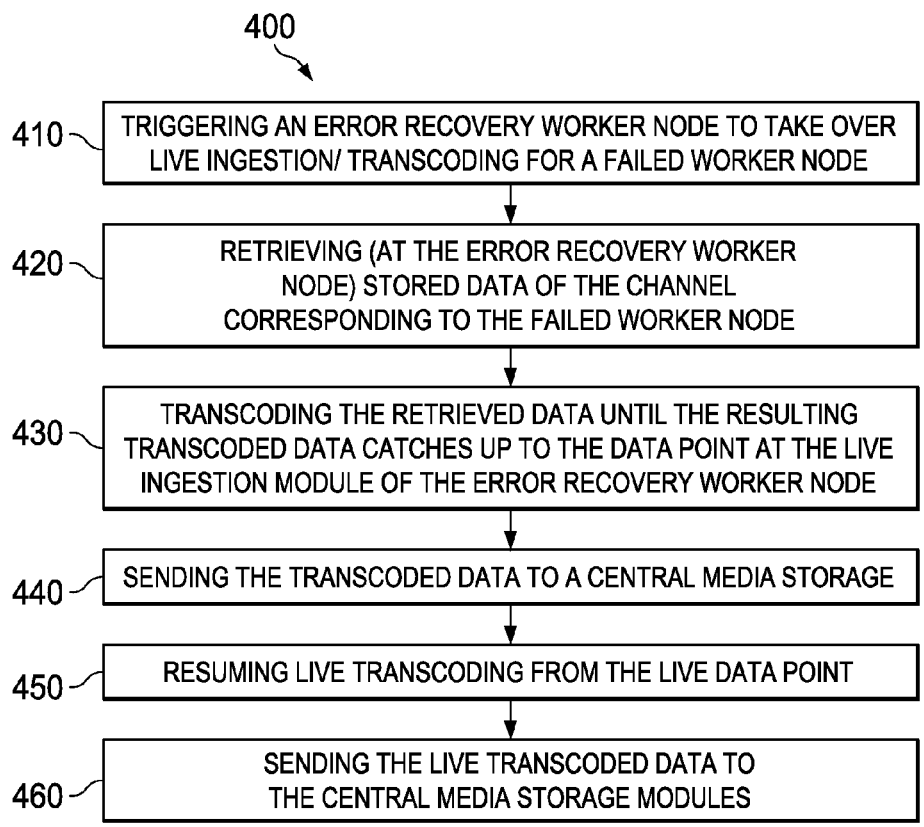
FIG. 4 is a flowchart that illustrates a method for improved and reliable backup mechanism for media or video ingestion and transcoding according to an embodiment of the disclosure.

FIG. 4 shows an embodiment method for improved and reliable backup mechanism for media or video ingestion and transcoding according to an embodiment of the disclosure. For instance, the method 400 can be implemented by the system 100 or one or more VMs or workstations. At step 410 of the method 400, an error recovery worker node (e.g., worker node 320) is triggered to take over live ingestion/transcoding for a failed worker node (e.g., channel 1 worker node 310). At step 420, the error recovery worker node retrieves stored data of the channel corresponding to the failed worker node. The data is retrieved from a local short term backup at another worker node that is still running and from the central media storage if needed. Part of the retrieved data is also received from a short term storage (e.g., the second short term storage 324) for output of the live ingestion module (e.g., the live ingestion module 322) of the error recovery worker node. At step 430, the error recovery worker node processes the retrieved data for transcoding until the resulting transcoded data catches up to the data point at the live ingestion module. The retrieved data is transcoded at a transcoding module for transcoding the retrieved stored data up to the live point (e.g., the catch-up transcoding module 326). At step 440, the transcoded data is sent to the central media storage. At step the 450, the error recovery transcoder resumes transcoding live data (from the live data point) from the live ingestion module. At step 460, the live transcoded data is sent to the central media storage (in real-time while processing next data in the stream at the live ingestion/transcoding modules).

In an embodiment, a controller (e.g., at a VM, a server, or in the cloud) detects a failure of a worker node for live ingestion/transcoding of a streamed channel and live ingestion/short term storage of another streamed channel. The other streamed channel (e.g., channel M) is transcoded at a second worker node. Thus, the controller starts an error recover worker node to take over the ingestion/transcoding for that channel. The error recover worker node also handles the live ingestion and short term storage for the other channel. The error recovery worker node performs catch-up transcoding before resuming live transcoding as described in method 400.

Figure 5:
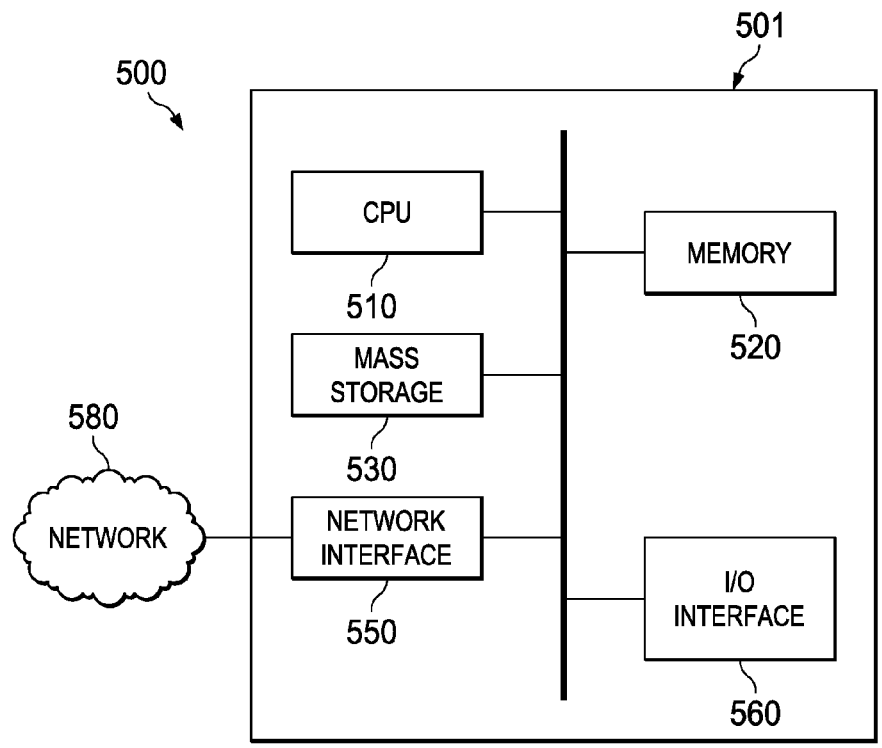
FIG. 5 is a diagram of an exemplary processing system that can be used to implement various embodiments.

FIG. 5 is a block diagram of an exemplary processing system 500 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a network interfaces, storage interfaces, and the like. The processing unit 501 may include a central processing unit (CPU) 510, a memory 520, a mass storage device 530, and an I/O interface 560 connected to a bus. The bus may be one or more of any type of several bus architectures including a memory bus or memory controller, a peripheral bus or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for media ingestion and transcoding, the method comprising:
   receiving, at an error recovery worker node, instruction to take over live ingestion and transcoding of a streamed channel assigned to an ingestion and transcoding worker node separate from the error recovery worker node;
   retrieving, at the error recovery worker node, stored data of the streamed channel, the stored data obtained from the ingestion and transcoding worker node;
   while retrieving the stored data of the streamed channel, performing live ingestion of real-time data of the streamed channel;
   storing the live ingested real-time data into a relatively short-term sliding window-based temporary storage at the error recovery worker node, wherein the relatively short-term sliding window is predetermined relative to content of the streamed channel;
   transcoding, at the error recovery worker node, the retrieved data for the streamed channel assigned to the ingestion and transcoding worker node until the transcoded data catches up to a live data point received at the error recovery worker node; and
   upon catching up to the live data point, resuming, at the error recovery worker node, live transcoding of data for the channel from the live data point.

2. The method of claim 1 further comprising:
   sending the transcoded retrieved data to a central media storage for a plurality of ingestion and transcoding worker nodes; and
   subsequently sending the live transcoded data to the central media storage.

3. The method of claim 1, wherein the stored data is retrieved from at least one of the temporary storage at the error recovery worker node, a remote temporary storage for the streamed channel at a second worker node, or a central media storage for a plurality of ingestion and transcoding worker nodes.

4. The method of claim 1, wherein the live ingested real-time data is used to resume live transcoding for the channel upon catching the live data point.

5. The method of claim 1, further comprising:
   while performing live ingestion of the real-time data of the streamed channel, performing live ingestion of real-time data of a second streamed channel assigned to the ingestion and transcoding worker node; and
   storing the live ingested real-time data of the second streamed channel into a second relatively short-term sliding window based temporary storage at the error recovery worker node, wherein the relatively short-term sliding window is predetermined of the second streamed channel.

6. A method implemented by a worker node for media ingestion and transcoding, the method comprising:
   performing live ingestion of data for a first media channel assigned to the worker node;
   live transcoding the live ingested data for the first media channel;
   forwarding the live transcoded data for the first media channel to a central media storage for a plurality of ingestion and transcoding worker nodes;
   performing live ingestion of data for a second media channel assigned to a second ingestion and transcoding worker node;
   temporary storing the live ingested data for the second media channel at the worker node within a short-term sliding window, wherein the short-term sliding window is predetermined relative to content of the second media channel; and
   upon failure of the worker node, sending at least some of the temporary stored data for the second media channel to an error recovery network component for ingestion and transcoding that is separate from the worker node and the second ingestion and transcoding worker node, wherein the temporary stored data allows the error recovery network component to catch UP in transcoding the second media channel from a time of failure of the worker node.

7. The method of claim 6, wherein at least some of the live transcoded data for the first media channel at the central media storage is accessible to an error recovery worker node to perform catch-up transcoding for the first media channel upon failure of the worker node.

8. The method of claim 6, wherein the stored live ingested data within the short-term sliding window is updated in real-time.

9. A network component for media ingestion and transcoding, the network component comprising:
   at least one processor coupled to a memory; and
   a non-transitory computer readable storage medium storing programming for execution by the at least one processor, the programming including instructions to:
      receive instruction to take over live ingestion and transcoding of a streamed channel assigned to a media ingestion and transcoding worker node separate from the network component;
      retrieve stored data of the streamed channel, the stored data obtained from the media ingestion and transcoding worker node;
      while retrieving the stored data of the streamed channel, perform live ingestion of real-time data of the streamed channel;
      store the live ingested real-time data into a relatively short-term sliding window-based temporary local storage component at the network component, wherein the relatively short-term sliding window is predetermined relative to content of the streamed channel;
      transcode the retrieved data for the streamed channel assigned to the ingestion and transcoding worker node until the transcoded data catches up to a live data point received at the network component; and
      upon catching up to the live data point, resume live transcoding of data for the channel from the live data point.

10. The network component of claim 9, wherein the programming includes further instructions to:
   send the transcoded retrieved data to a central media storage for a plurality of ingestion and transcoding worker nodes; and
   subsequently send the live transcoded data to the central media storage.

11. The network component of claim 9 wherein the stored data is retrieved from at least one of the local temporary storage component, a remote temporary storage component for storing the streamed channel at a second ingestion and transcoding worker node, or a central media storage for a plurality of ingestion and transcoding worker nodes.

12. The network component of claim 11 further comprising a second local storage component for temporary storing live ingested data for a second streamed channel.

13. The network component of claim 12, wherein the programming includes further instructions to:
- perform ingestion of real-time data of the second streamed channel assigned to the ingestion and transcoding worker node; and
- store the ingested real-time data of the second streamed channel in the second local storage component.

14. The network component of claim 9, wherein the network component comprises a virtual machine (VM) or is part of a physical machine in a data center.

15. The network component of claim 9, wherein the network component comprises more processing resources than the ingestion and transcoding worker node.

16. A network component for media ingestion and transcoding, the network component comprising:
- at least one processor coupled to a memory; and
- a non-transitory computer readable storage medium storing programming for execution by the at least one processor, the programming including instructions to:
    - perform live ingestion of real-time data for a first media channel assigned to the network component;
    - live transcode the ingested real-time data for the first media channel;
    - forward the live transcoded real-time data for the first media channel to a central media storage for a plurality of ingestion and transcoding worker nodes; and
    - perform live ingestion of real-time data for a second media channel assigned to a second network component for ingestion and transcoding;
    - temporary store, for a predetermined short-term sliding window, the live ingested data for the second media channel at the network component, wherein the short-term sliding window is predetermined relative to content of the second media channel; and
    - upon failure of the network component, send at least some of the temporary stored data for the second media channel to an error recovery network component for ingestion and transcoding that is separate from the network component and the second network component for ingestion and transcoding, wherein the temporary stored data allows the error recovery network component to catch up in transcoding the second media channel from a time of failure of the network component.

\* \* \* \* \*